United States Patent Office 3,149,668
Patented Sept. 22, 1964

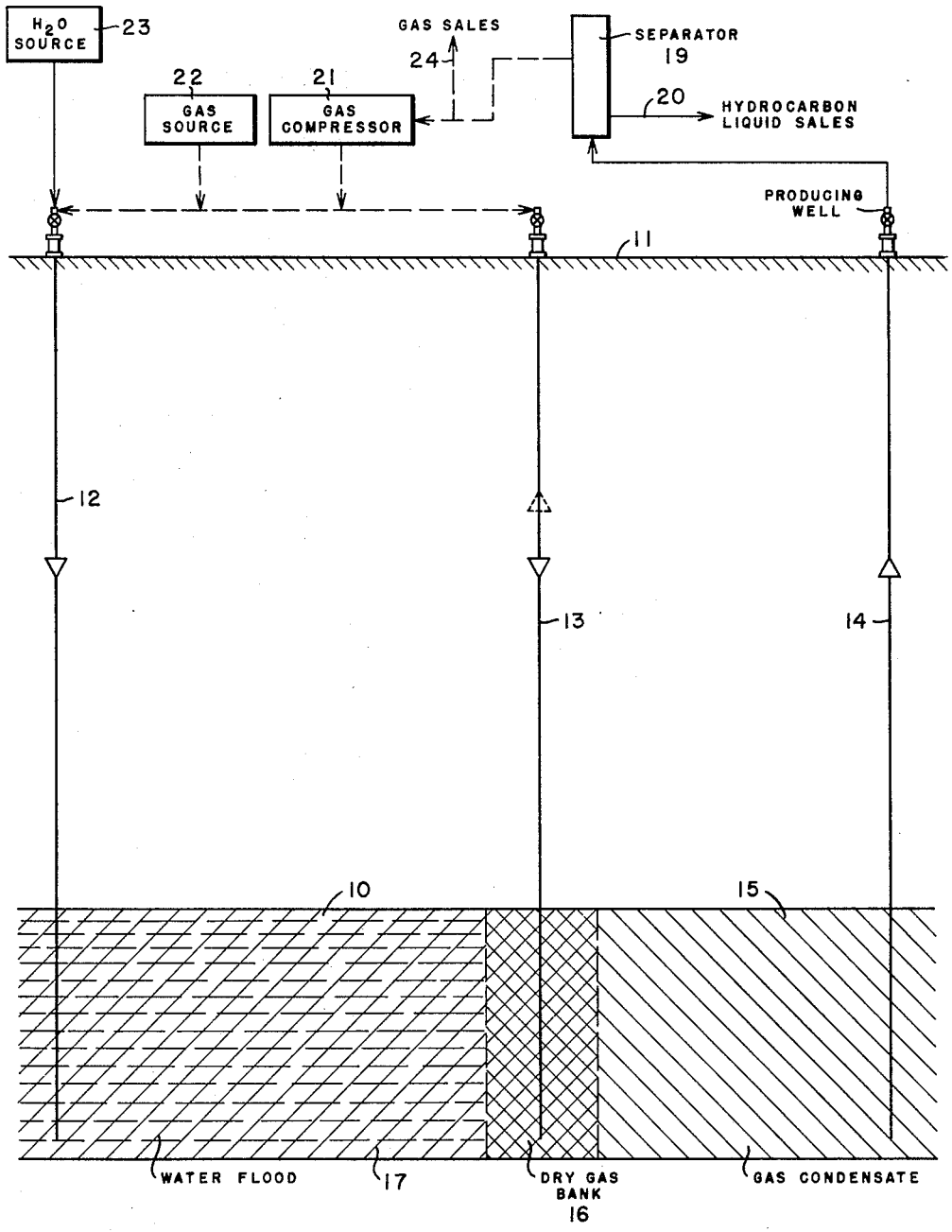

3,149,668
GAS RECOVERY FROM GAS CONDENSATE
RESERVOIRS
Harry S. Arendt, Bellaire, Tex., assignor, by mesne assignments, to Jersey Production Research Company, Tulsa, Okla., a corporation of Delaware
Filed Dec. 10, 1959, Ser. No. 858,752
7 Claims. (Cl. 166—7)

This invention relates to the recovery of hydrocarbons from gas reservoirs having appreciable condensate content.

At relatively moderate pressures (usually below about 1500 p.s.i.) the capacity of hydrocarbon gases to vaporize intermediate molecular weight hydrocarbons (propane through decane) increases with decreases in pressure and conversely decreases with increases in pressure. However, at higher pressures and provided the temperature is above a minimum critical temperature, a reversal of the expected change in phase is encountered and a decrease in pressure effects a condensation of liquid from the gas. This phenomenon of forming a liquid condensate upon reducing rather than increasing pressure is known as retrograde condensation or, more precisely, isothermal retrograde condensate with decrease in pressure. The temperatures encountered in gas reservoirs frequently are higher than the minimum temperature required for occurrence of the retrograde condensation phenomenon. Thus, in many gas reservoirs having appreciable condensate content, retrograde condensation occurs when the reservoir pressure declines, which results in a comparable loss in stock tank or gas plant liquid recovery. To avoid this retrograde loss, one cycling method involves prevention or lessening of pressure decline by injecting dry gas, that is, a hydrocarbon gas containing primarily methane and minor amounts of the light and intermediate hydrocarbons, such as ethane, propane, butane, etc., into the reservoir while the reservoir is produced at a point spaced from the injection point. The dry gas is frequently obtained from produced hydrocarbon fluids. These gaseous fluids are processed either through conventional lease facilities or through a gas plant to remove the liquid portions thereof and the remaining residue or dry gas is afterwards reinjected into the reservoir.

This method of avoiding the retrograde loss has the disadvantage that in gas cycling the sale of the gas is deferred until the end of cycling operations, which may be 20 years or more, with a consequent reduction of over 50 percent of the present day value of the gas. Additional disadvantages of this method are:

(a) The significant cost of compressing and injecting the dry gas.

(b) The significant amount of gas used as compressor fuel which decreases the ultimate volume available for sale.

(c) The relatively poor over-all pattern and conformance efficiency which rarely exceeds 75 percent so that a significant proportion of wet gas and its condensate are left in the reservoir. By wet gas is meant gas containing lesser percentages of methane and higher percentages of enriching components of the lighter normally gaseous hydrocarbons, such as ethane, propane, butane, etc.

The present invention minimizes all four of the above disadvantages by modifying the customary gas cycling program to the extent that both water and gas are injected into one extremity of the reservoir while reservoir fluids are produced from the other extremity. The water and gas may be injected simultaneously or only a limited bank of dry gas may be first injected and this limited bank followed by injection of water.

Thus, in addition to making possible the immediate sale of the major portion of the produced gas, a primary object of the present invention is to provide an improved displacement of hydrocarbon fluids contained in a gas condensate reservoir. This and other objects of the present invention will be apparent from a description thereof taken in conjunction with the drawings wherein:

The sole figure is a diagrammatic view showing the system for carrying out the invention.

Referring to the drawing, numeral 10 designates a gas condensate reservoir which fluidly communicates with the surface of the earth 11 through injection wells 12 and 13 and production well 14. The hydrocarbon fluids in reservoir 10, designated 15, are being displaced by a dry gas bank, designated 16, which, in turn, is being displaced by the waterflood, designated 17.

The produced hydrocarbon fluids may be sent to a separator 19 where the liquid and gaseous hydrocarbons are separated. Other types of liquid recovery or extraction systems, such as absorption, adsorption, or refrigeration types of gasoline plants may be used in place of or in addition to the separator for improved liquid recovery. The liquid hydrocarbons may be sold, as indicated by the arrowed line 20, and the dry gas separated therefrom sent to a compressor 21 where the pressure of the gas that is to be injected is raised to a sufficient pressure to overcome the reservoir pressure. An overall average of about 80 percent of the produced gas is sent to sales line 24 for immediate sales. A separate gas source 22 may be used to supplement the cycled gas or, if desired, it may be used in substitution thereof. This supplementary gas may be an inert dry hydrocarbon gas or any other preferably cheap insoluble inert gas, such as flue gas, nitrogen, air, etc. A source of water 23 connects to injection well 12. This water source may be suitably reservoir salt water.

To initiate the operation, a bank of dry gas 16 is injected through injection well 12 from either gas source 22 or cycled dry gas. During this initial period all of the produced gas may be injected to form the bank or if a slight pressure drop can be allowed, a portion of the produced gas can be sold initially. Then, water is injected through injection well 12 from source 23 which forces the dry gas across the reservoir 10 to displace hydrocarbon fluids 15 in the reservoir. During this water injection phase a volume of gas equivalent in reservoir volume to the volume of injected water is sold through sales line 24. If desired, when dry gas bank 16 reaches injection well 13, additional dry gas may be injected to supplement the bank 16 through injection well 13 behind the displaced hydrocarbon fluid 15 but ahead of the water flood 17. After completion of the water-gas flood, the injected methane may be recovered by pressure blowdown. Although the operation of the invention has been described with regard to injection of gas and water separately, the invention may be practiced by injecting the gas and water simultaneously.

If the pressure drop required to move the necessary volume of water across the reservoir is excessive, only a partial conversion to water injection would be advantageous.

It is preferred that the amount of dry gas required in the dry gas bank at any time not exceed about 20 percent of the volume capable of being cycled. Thus, the other 80 percent of the gas produced is available for immediate sale. Also, the essentially 100 percent displacement efficiency in the conformance portion of the reservoir which is inherent to the miscible displacement of the wet gas 15 by the dry gas bank 16 is preserved. Additionally, because of: (a) the favorable mobility ratio of about 1:25 existing for the displacement of gas by salt water; and (b) the effectiveness of capillary forces in helping water to invade tight or bypassed sands and displaces the gas therein, both the conformance and pattern efficiency will be significantly increased. The extremely favorable mobility ratio, with the injected water approximately 25 times as viscous as the gas being displaced, greatly improves both the pattern and conformance efficiency. With this viscosity ratio, if a finger of water in a more permeable member moves ahead of the water in the overlying or underlying less permeable members, the combination of the longer distance through which water is flowing in the more permeable member and its greater viscosity tends to slow down the rate of flow of the water in the more permeable member. This slowing down will thus tend to avoid a channel of injected fluid from developing in a highly permeable member from the injection to the producing wells, with the consequent trapping of gas in the less permeable member. With dry gas injected alone, the viscosities of the produced and injected fluids are approximately equal.

With the water injection capillary forces also effectively aid in improving conformance and, consequently, the ultimate recovery of condensate gas. Water will move spontaneously from the more permeable portions of the reservoir to the less permeable as a result of capillary pressure. At the begining of waterflooding, the capillary pressures in contiguous highly permeable and less permeable portions are equalized. When flooding begins, water tends to move more rapidly into the highly permeable portion. As the water saturation in the more permeable zone increases, the capillary pressure in that zone changes. The equivalence in capillary pressure betwen the two zones is upset and because of this difference in pressure fluids will interchange between the two zones until the capillary pressures are again the same. This interchange process results in a flow of water into the tight portions from the more permeable with a countercurrent expulsion of dry gas from the tight into the more permeable and permits gas that would otherwise be trapped in the tight zones to be recovered. In cycling with dry gas alone, capillarity is entirely ineffective as there is no capillary pressure difference between wet and dry gas.

Additional advantages are that water can be pumped to the injection pressure at only a fraction of the cost of compressing gas and the amount of gas burned as compressor fuel is reduced in proportion to the reduction of the amount of gas injected. Therefore, significant savings are achieved by using a combined waterflood gas injection operation to displace hydrocarbon fluids in gas condensate reservoirs.

Having fully described the method, objects, and operation of my invention, I claim:

1. A method for recovering hydrocarbons from a subterranean gas condensate reservoir comprising the steps of injecting water and dry gas into said reservoir through one or more injection wells penetrating said reservoir and producing through one or more production wells penetrating said reservoir and spaced from said injection well condensate gas displaced from said reservoir by said water and dry gas, said water and dry gas injection pressures being at least as great as reservoir pressure and said water and dry gas being injected in volumes equivalent to the reservoir volume of the produced gas in order to inhibit losses caused by retrograte condensation due to pressure decline, said volume of water injected being at least 80% of the reservoir volume voided by said produced gas.

2. A method as recited in claim 1 including injecting said water and dry gas simultaneously.

3. A method as recited in claim 2 including halting said water and dry gas injection and recovering said injected dry gas by pressure blowdown.

4. A method for recovering hydrocarbons from a subterranean gas condensate reservoir comprising the steps of injecting through one or more injection wells penetrating said reservoir dry gas in an amount sufficient to establish a bank of dry gas in said reservoir, injecting water through said injection well to move said dry gas bank through said reservoir to one or more production wells penetrating said reservoir and removing to the earth's surface through said production well gas displaced from said reservoir by said gas bank and water, said water and dry gas injection pressures being at least as great as reservoir pressure and said water and dry gas being injected in volumes equivalent to the reservoir volume of the produced gas in order to inhibit losses caused by retrograde condensation due to pressure decline, said volume of water injected being at least 80% of the reservoir volume voided by said produced gas.

5. A method as recited in claim 4 including employing dry gas separated from said produced gas as said injected dry gas.

6. A method as recited in claim 5 including employing one or more additional injection wells located between said injection well through which said water and dry gas are injected and the production well and injecting additional dry gas through the additional injection well when the initially created dry gas bank reaches the intermediate injection well.

7. A method as recited in claim 6 including halting said water and dry gas injection and recovering said injected dry gas by pressure blowdown.

References Cited in the file of this patent

UNITED STATES PATENTS

| | | |
|---|---|---|
| 1,511,067 | Russell | Oct. 7, 1924 |
| 2,669,306 | Teter et al. | Feb. 16, 1954 |
| 2,669,307 | Mulholland et al. | Feb. 16, 1954 |
| 2,708,481 | Allen | May 17, 1955 |
| 2,718,262 | Binder | Sept. 20, 1955 |
| 2,736,381 | Allen | Feb. 28, 1956 |
| 2,767,791 | Van Dijck | Oct. 23, 1956 |
| 2,798,556 | Binder et al. | July 9, 1957 |
| 2,856,000 | Barron | Oct. 14, 1958 |
| 2,968,350 | Slobod et al. | Jan. 17, 1961 |